United States Patent [19]

Baun, Jr. et al.

[11] 4,320,505

[45] Mar. 16, 1982

[54] PROCESSING APPARATUS FOR DATA RATE REDUCTION

[75] Inventors: Philip J. Baun, Jr., Andover, Mass.; Thomas B. Merrick, Atkinson, N.H.

[73] Assignee: Bell Telephone Laboratories, Incorporated, Murray Hill, N.J.

[21] Appl. No.: 59,759

[22] Filed: Jul. 23, 1979

[51] Int. Cl.³ .............................................. H04J 3/12
[52] U.S. Cl. ................................ 370/110; 179/18 FG
[58] Field of Search ..................... 179/18 FC, 18 FG; 370/110, 111

[56] References Cited

U.S. PATENT DOCUMENTS

| | | | |
|---|---|---|---|
| 3,166,734 | 1/1965 | Helfrich | 340/147 |
| 3,420,960 | 1/1969 | Jacoby | 179/18 FG |
| 3,629,851 | 12/1971 | Werner | 179/18 FG |
| 4,059,731 | 11/1977 | Green | 370/110 |
| 4,176,256 | 11/1979 | Froth | 179/18 FG |

Primary Examiner—David L. Stewart
Attorney, Agent, or Firm—John K. Mullarney

[57] ABSTRACT

A digital channel bank (11) has a plurality of channel units (17) interconnected to a digroup controller (10) over a shared data bus (30). A data processing circuit (FIG. 2) is included in each channel unit for the purpose of reducing the received signaling status information transmitted from each channel unit to the controller. The circuit (e.g., gates 24–27) serves to prevent single bit errors from being recognized as changes in the received signaling state. The circuit (gate 28) also insures that only changes in the signaling status, rather than current status, are reported to the controller. The circuit also incorporates a predetermined amount of delay for the purpose of eliminating multiple messages to the controller when the A and B path signaling bits change in adjacent signaling frames.

8 Claims, 3 Drawing Figures

| EX NO. | RSA | PA | RA | LA | XRA |
|---|---|---|---|---|---|
| 0 | 0 | 0 | 0 | 0 | 0 |
| 1 | 0 | 0 | 0 | 1 | 0 |
| 2 | 0 | 0 | 1 | 0 | 1 |
| 3 | 0 | 0 | 1 | 1 | 0 |
| 4 | 0 | 1 | 0 | 0 | 0 |
| 5 | 0 | 1 | 0 | 1 | 0 |
| 6 | 0 | 1 | 1 | 0 | 1 |
| 7 | 0 | 1 | 1 | 1 | 1 |
| 8 | 1 | 0 | 0 | 0 | 0 |
| 9 | 1 | 0 | 0 | 1 | 0 |
| 10 | 1 | 0 | 1 | 0 | 1 |
| 11 | 1 | 0 | 1 | 1 | 1 |
| 12 | 1 | 1 | 0 | 0 | 1 |
| 13 | 1 | 1 | 0 | 1 | 0 |
| 14 | 1 | 1 | 1 | 0 | 1 |
| 15 | 1 | 1 | 1 | 1 | 1 |

PROCESSING APPARATUS FOR DATA RATE REDUCTION

TECHNICAL FIELD

This invention relates to digital communications systems and, more particularly, to the processing of signaling information in the channel units of a digital channel bank.

BACKGROUND OF THE INVENTION

A new digital channel bank has been designed to obtain a more economical interface between the No. 1 ESS machine and T-carrier facilities by obliterating the traditional interface between switching and transmission circuits. The predecessor arrangements were predicated on a standard interface for all carrier and metallic trunks. These used multiple leads for each trunk between the trunk relay circuits and the carrier terminals via an Intermediate Distribution Frame (IDF) to exchange signaling and supervisory information. The No. 1 ESS common control interfaced the trunk relay circuits directly for each relay and ferrod sensor via a signal distributor and scanner, respectively.

The newly designed, digital channel bank replaces the earlier carrier terminal, trunk relay circuits, scanner, and signal distributor with a single integrated frame. This design also eliminates the IDF and the need for the per-trunk leads to interconnect the earlier separate trunk relay circuits and carrier terminals.

In this new channel bank design, a controller unit communicates over a shared bidirectional data bus with up to twenty-four (24) channel units. A great deal of data is presented to (and by) the channel units and this information must be transferred to the controller. For example, it is necessary that each channel unit report the following data to the controller: received signaling status; loop closure status; maintenance status; channel unit relay status, et cetera. The task is aggravated by the fact that only a few leads (e.g. four) are available in the back plane of the channel banks for use in data transfer between the channel units and the controller.

Techniques have been adopted to improve the efficiency of the data handling process. For example, reporting only highest priority data can be used to obtain a more efficient data transfer method. Nevertheless, to meet the data transfer-time constraint presented, the quantity of data carried by the shared bidirectional data bus must be minimized.

SUMMARY OF THE INVENTION

It is a primary object of the present invention to reduce the number of transmissions between a plurality of (channel) units and the controller for the same.

Recognizing that the received signaling bit information is the highest rate and perhaps most significant of the channel unit data generators, the present invention is directed at reducing the received signaling status information transmitted from each channel unit to the controller. A digital filtering algorithm is used in each channel unit circuit to prevent single bit errors from being recognized as changes in the received signaling state. The filtering algorithm requires (for 4-state signaling) that a change in the state of either signaling bit (A or B) be present in two successive sampling intervals before the change can be reported by the channel unit to the controller. Rather than continuously reporting the current status, each channel unit circuit also incorporates a change-only reporting algorithm whereby only valid changes in the signaling status are reported by the channel unit. After a delay, the states of both A and B signaling bits are concurrently reported whenever there is a valid change in either bit. This delay eliminates multiple messages to the controller when both bits change in adjacent reporting periods.

BRIEF DESCRIPTION OF THE DRAWING

The invention will be more fully appreciated from the following detailed description when the same is considered in connection with the accompanying drawings in which.

DETAILED DESCRIPTION

Figure 1:
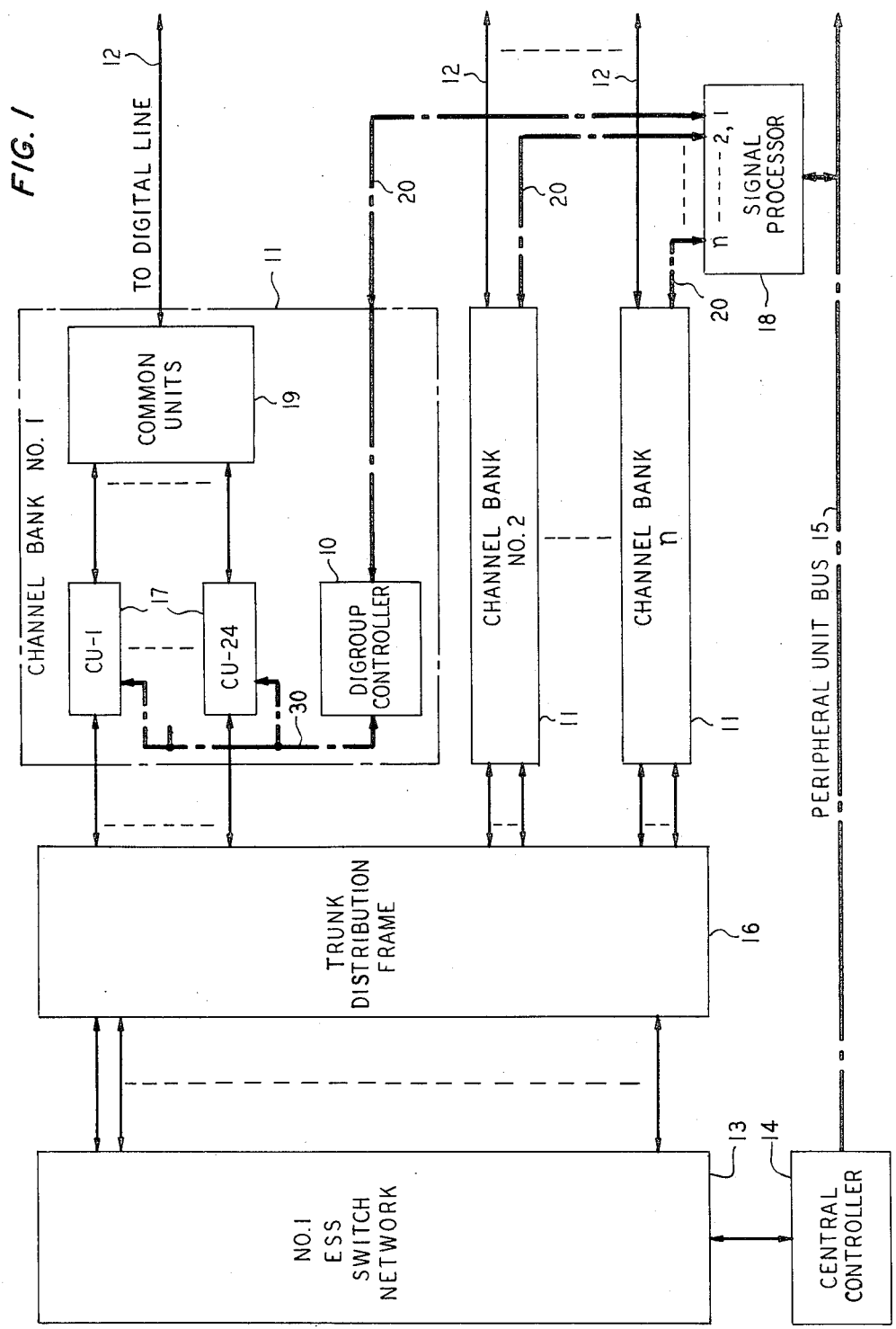
FIG. 1 is a simplified schematic block diagram of a central office in which the present invention can be advantageously utilized.

Turning now to FIG. 1 of the drawings, a plurality of digital channel banks 11 are used to interconnect an electronic switching system such as the No. 1 ESS to digital transmission facilities such as T-carrier lines 12. This, of course, is one of the primary purposes of all digital channel banks. Electronic switching systems starting with the No. 1 ESS have been in use since the mid-1960s and have been extensively described in the literature (see the *Bell System Technical Journal*, Vol. 43, No. 5, September 1964). The ESS switching system comprises a switch network 13 and a processor or central controller 14 operating with a stored program to control the actions of the central office and, in particular, the switch network. The central controller 14 communicates with the peripheral units of the switching system over the peripheral unit bus 15. The peripherals and the bus system of the ESS machine are described in detail in the above cited issue of the *Bell System Technical Journal*. The trunk distribution frame 16 is simply a cross-connect frame found in all central offices.

The newly designed, digital channel banks 11 use an overall architecture similar to that of earlier channel banks. The high frequency line interfaces of this new channel bank are similar to those of the D4 channel bank, for example, thus permitting use with T1, T1C, or T2 carrier facilities or with digital multiplexers having comparable signal formats. Baseband signals from each of the channel units 17 in a channel bank connect directly to the 2-wire trunk distribution frame (TDF) 16. Voice frequency message and supervisory states presented to the TDF by the channel units are similar to those provided in predecessor arrangements by ESS trunk circuits. However, channel unit supervisory states, line signaling, bank status and bank diagnostics are indirectly (i.e., via the signal processor 18) controlled by and reported to the central controller 14. This link between the ESS central controller and the channel banks 11 gives the latter the character of an ESS peripheral.

The common units 19 of a channel bank 11 are similar to the common units of earlier channel banks and hence a detailed description of the same herein would not appear to be necessary. For a general description of a digital channel bank see the U.S. Pat. No. 4,059,731 to J. H. Green et al., issued Nov. 22, 1977. Similarly, the channel unit functions such as two-to-four wire conversion, level adjustment, filtering, analog-to-PAM conversion, etc. are the same as the functions performed by the channel units of earlier channel banks.

The newly designed, digital channel banks 11 differ from earlier banks in one significant respect: data communication paths are provided in these banks for the exchange of information between the banks and an associated central controller 14 via a signal processor 18.

The signal processor 18 receives instructions from the ESS central controller 14 over the peripheral unit bus 15 and reports back to the controller over the bus. The signal processor (SP), which is internally duplicated for reliability purpose, controls information to and processes information from a plurality of digital groups or digroups (e.g., D4-type banks or 480 channels). For example, instructions concerning the transmit signaling states and the states of relays located in each channel unit originate in the central controller 14 and are sent to the signal processor 18 over bus 15. The SP translates each instruction into appropriate code words which are then sent to the appropriate digroup. This transmission is delivered over a dedicated serial data bus 20 to the digroup control unit 10 of the appropriate channel bank. The digroup control unit (DCU) identifies the time slot belonging to the channel for which the coded instruction is destined, and transfers the instruction to the channel unit during the appropriate channel time slot. Information flow in the reverse direction is similar.

Each digroup requires a dedicated digroup control unit (DCU) 10; and, each DCU communicates over a shared or common bidirectional data bus 30 with the twenty-four channel units dedicated to each digroup. A DCU converts and transforms serial data from the SP into parallel data and transfers the signaling states and the relay states over the bidirectional data bus.

In the reverse direction of information flow, the received signaling information is transmitted from the channel units over the common bidirectional data bus 30 to the DCU and thence to the SP. Relay state changes are also reported from the channel units to the DCU. In this manner, each DCU acts as an information junction point where data from the SP are distributed among the channel units, and the data gathered from the channel units are passed on to the SP. In addition to channel unit related information, digroup alarm, maintenance status and control information is communicated between the DCUs and the SP; the DCUs also answer diagnostic requests from the SP to help localize faults.

As will be appreciated by those in the art, a great deal of data must be transferred from the channel units 17 to the controller unit 10 over the common data bus 30. A recitation of the data that each channel unit must report has been set forth above. To meet the data transfer-time constraint presented, it is imperative that the efficiency of the data handling process be maximized. One evident way of accomplishing this is to reduce the quantity of data carried by the common data bus 30 as much as possible. Recognizing that the received signaling bit information is the highest rate and perhaps most significant of the channel unit data generators, the present invention is directed at reducing the received signaling status information transmitted from each channel unit 17 to the digroup controller unit 10.

Figures 2, 3:
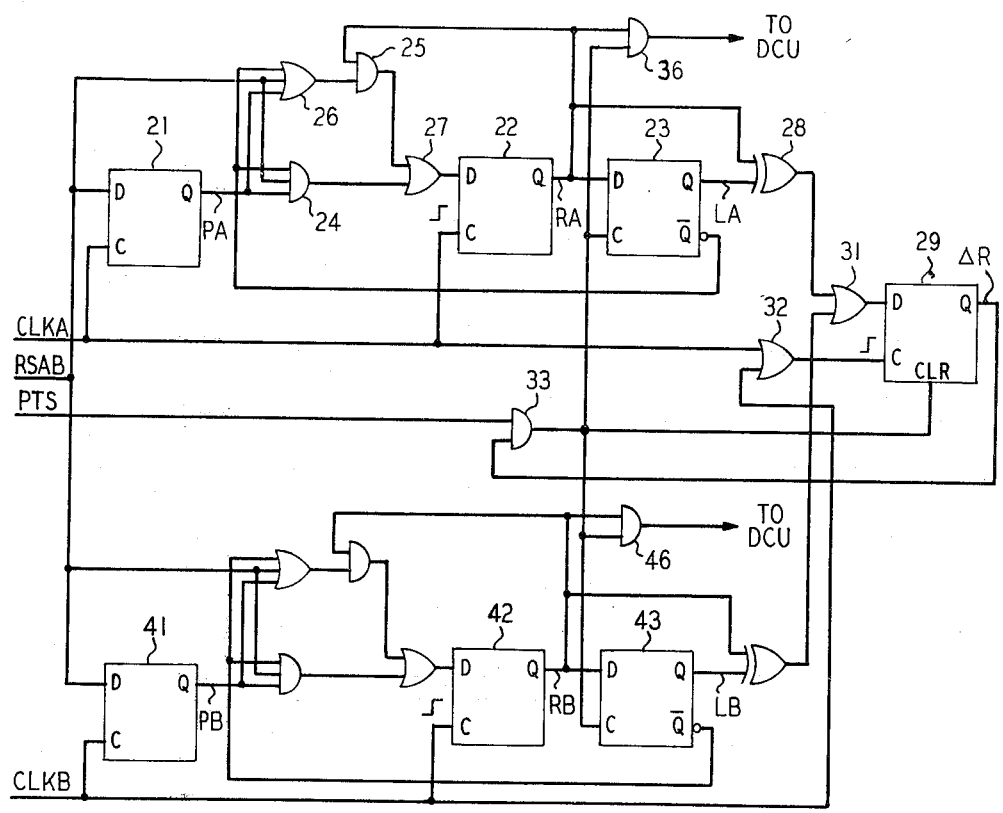
FIG. 2 is a schematic diagram of a data processing circuit in accordance with the present invention.
FIG. 3 is a truth table useful in the explanation of the operation of the FIG. 2 circuit.

In accordance with the present invention, each channel unit is provided with the data processing circuit shown in FIG. 2 of the drawings. The circuit is designed to accomodate A and B path signaling. For some switching systems, two signaling paths (A and B) are required, the two paths allowing up to four signaling states for each channel. In a super frame of 12 frames, the sixth and twelfth frames contain the respective signaling bits of the two signaling paths. Thus, a signaling frame occurs every sixth frame with the A and B signaling bits alternating therein. The A and B received signaling bits are delivered to the circuit of FIG. 2 via the common RSAB lead from the receive unit of the common equipment 19. The CLKA and CLKB leads provide pulses to steer the A signaling bits on the common RSAB lead into flip-flop 21 and the B signaling bits into flip-flop 41. The CLKA and CLKB pulses are generated by channel select logic common to all digital channel banks. The flip-flops 21 and 41 operate in a conventional manner; an enabling pulse applied to the clock (C) input reads the signal at the D input into the flip-flop store.

The flip-flops 21, 22 and 23 and the logic interconnecting the same serve to process the A signaling bits in the manner to be described. The flip-flops 41, 42 and 43 and the logic associated therewith serve to process the B signaling bits in the very same manner. In fact, a close examination of FIG. 2 will show that it comprises two identical halves. Accordingly, only the signal processing of the received A signaling bits will be described in detail herein.

The Q output of flip-flop 21 is coupled to the D input of flip-flop 22 via the combinational logic comprising AND gates 24, 25 and OR gate 26, 27. The flip-flop 22 is a positive-edge triggered flip-flop. That is, the positive or leading edge of the CLKA pulse delivered to the clock (c) input causes the signal at the D input, at that instant, to be read into the flip-flop. Thereafter, no further read in to the flip-flop can take place until the occurrence of the next positive leading edge of the clock pulse.

The Q output of flip-flop 22 is coupled back to the input of AND gate 25 and coupled forward to the D input of flip-flop 23, with the $\overline{Q}$ output of the latter coupled back to the gates 24 and 26 of the combinational logic.

The Q output of flip-flop 21 is designated PA or the preceding value of the received A signaling bit (RSA), available from RSAB when CLKA is true; the Q output of flip-flop 22 is designated RA, i.e., the received signaling bit after the single bit filtering to be described; and the Q output of flip-flop 23 is designated LA, the last value of RA reported to the DCU.

The combinational logic comprising the gates 24–27 provides the single bit filtering of the A signaling bits. The combinational logic circuit operation is defined by the following Boolean equation:

$$XRA = PA \cdot RSA \cdot \overline{LA} + RA \cdot (PA + RSA + \overline{LA})$$

where XRA is the next state of RA, i.e., the value of RA after the CLKA pulse.

The variables RSA, PA, RA and LA can take on the value of "0" or "1" and there are sixteen possible combinations or permutations of the same. This is shown in the truth table of FIG. 3, along with the resultant value of XRA. This truth table is readily derived using the Boolean equation above.

The truth table of FIG. 3 is useful in understanding the operation of the FIG. 2 circuit. For each example, the truth table illustrates the current value of the incoming received signaling bit (RSA), the preceding value (PA) of the signaling bit, the received signal bit after filtering (RA), and the last value (LA) of the A signaling bit reported to the DCU 10. Thus, each example illustrates a possible signaling bit sequence in the A path, and XRA illustrates the next state of RA for the particular example.

In the truth table, examples no. 0 and 15 both represent a steady state condition and a change in RA would neither be expected nor wanted (i.e., XRA=RA). Examples no. 1 and 14 illustrate an essentially steady state condition (RSA=PA=RA) and hence no change in RA is called for (XRA=RA). However, since RA differs from LA, the new value of RA will be reported to the DCU in the manner to be described. Examples no. 3 and 12 indicate that there is an apparent valid change in the A signaling bits and the next value of RA(XRA) should be changed accordingly. Examples 4 through 11 illustrate the filtering algorithm. Note that in each of these latter examples the successive A signaling bits RSA and PA differ and therefore RA should not be changed (XRA=RA). Lastly, in examples 2 and 13, it will be seen that RA differs from LA, indicating that RA has not yet been reported to the DCU and hence should not be changed until it is so reported; therefore, XRA=RA.

The data processing operation is identical for the B signaling bits; the Boolean expression for XRB is the same as that set forth for XRA above; and, the truth table for the B bits is the same as that shown for A bits in FIG. 3.

After the filtering operation, the received signaling bit (RA) is compared with the last signaling bit (LA) reported to the DCU. This comparison is carried out by means of the exclusive-OR gate 28. If (and only if) RA differs from LA, a "change" signal is delivered to the D input of flip-flop 29 via the OR gate 31. The flip-flop 29 is a positive-edge triggered flip-flop; the leading edge of the CLKA pulse delivered to the clock (c) input via the OR gate 32 causes the signal at the D input, at that time, to be read into flip-flop store.

The CLKA pulse that clocks a new RA bit into the flip-flop 22 also serves to clock the flip-flop 29. As noted, the flip-flops 22 and 29 are both positive edge triggered flip-flops. Therefore, by the time that the new RA bit, which appears at the Q output of flip-flop 22, is compared with LA in exclusive-OR gate 28 and the resultant "change" signal coupled to the D input of flip-flop 29 via the OR gate 31, the leading edge of CLKA delivered to the c input of flip-flop 29 will have passed. Accordingly, the aforementioned change signal will not be read into the flip-flop 29 until the occurrence of the CLKB signal, six frames later in time. This effective delay of one receive signaling time period allows the other (B) side of the FIG. 2 circuit to update. Since both halves of the data processing circuit of FIG. 2 receive the same signaling information in most trunk applications, this eliminates multiple messages to the ESS controller for a single change in receive signaling information.

When two consecutive RSA or RSB inputs, different from those stored, are received by the corresponding half of the FIG. 2 circuit, the flip-flop 29 is set to its "1" state (output $\Delta R=1$). The Q output of flip-flop 29 ($\Delta R$) is delivered as an enabling signal to the AND gate 33. An aperiodic interrogation signal, called permission to send (PTS), is sent by the DCU 10 to each of the channel units in a predetermined sequence. This PTS pulse is coupled to the AND gate 33 and hence with $\Delta R=1$ the AND gate 33 is fully enabled to initiate several functions. First, the output of enabled AND gate 33 serves to enable the AND gates 36 and 46 to deliver simultaneously the RA and RB signaling bits to the DCU over the data bus 30. Concurrently therewith, the RA and RB signal bits are clocked into the flip-flops 23 and 43. Finally, the output of AND gate 33 serves to clear the flip-flop 29, returning the same to its "0" state.

While a specific embodiment of the invention has been described in detail, it is to be understood that numerous other embodiments may be devised by those skilled in the art without departing from the spirit and scope of the invention.

We claim:

1. In a digital transmission system which comprises digital channel banks and wherein a plurality of digital message signals are transmitted between channel banks in a plurality of time division multiplexed channels, the least significant bit of each channel being borrowed for signaling purposes every $6^{th}$ frame, at least one channel bank (11) having a plurality of channel units (17) interconnected to a controller (10) via a shared data bus (30), each channel unit receiving the signaling information bits of a given channel, each channel unit being characterized by a data processing circuit (FIG. 2) for minimizing the number of signaling data transmissions to the controller over the shared data bus, said circuit comprising means (24–27) for filtering out single bit errors in the received signaling information bits, means (23) for storing the signaling status last reported to the controller, means (28) for comparing the signaling status last reported to the controller with the current status from the output of the filtering means and for reporting (36, 46) the latter to the controller when the compared status signals differ, and means for delaying the reporting of a signaling status change for at least one receive signaling time period of six frames.

2. A data processing circuit as defined in claim 1 including means (33) for updating the stored signaling status to said current status when the latter is reported to the controller.

3. A data processing circuit as defined in claims 1 or 2 having two identical halves for the respective processing of the signaling bits of A and B path signaling.

4. In a digital transmission system which comprises digital channel banks and wherein a plurality of digital message signals are transmitted between channel banks in a plurality of time division multiplexed channels, the least significant bit of each channel being borrowed for signaling purposes every $6^{th}$ frame, at least one channel bank (11) having a plurality of channel units (17) interconnected to a controller (10) via a shared data bus (30), each channel unit receiving the A and B path signaling information bits of a given channel, each channel unit being characterized by a data processing circuit (FIG. 2) for minimizing the number of signaling data transmissions to the controller over the shared data bus, said circuit comprising means (path A, 24–27) for preventing single bit changes in either signaling path from being recognized as changes in the received signaling state, means (23, 43) for storing the A and B path signaling bits last reported to the controller, means (path A, 28) for comparing the A and B signaling bits last reported to the controller with the current A and B signaling bits from the output of the preventing means and for reporting (36, 46) the latter to the controller when the compared signaling bits differ and means for delaying the reporting of a signaling state change for at least one receive signaling time period of six frames.

5. A data processing circuit as defined in claim 4 wherein said preventing means requires that a change in the state of either signaling bit be present in two consecutive signaling periods before a change can be reported to the controller.

6. A data processing circuit as defined in claim 5 wherein the A and B signaling bits are concurrently reported to the controller after the aforementioned delay.

7. A data processing circuit as defined in claim 6 including means (33) for updating the stored A and B signaling states in accordance with said current A and B signaling bits whenever the latter are reported to the controller.

8. A data processing circuit as defined in claim 7 including means for preventing said updating until said current A and B signaling bits are reported to the controller (see FIG. 3, Ex. Nos. 2 and 13).

* * * * *